June 30, 1953 — J. M. WAGNER — 2,643,450

AUTOMOBILE BRAKE SHOE LINING PROTECTOR

Filed Aug. 30, 1950

INVENTOR

James M Wagner

Patented June 30, 1953

2,643,450

UNITED STATES PATENT OFFICE 2,643,450

AUTOMOBILE BRAKE SHOE LINING PROTECTOR

James M. Wagner, Harrisburg, Pa.

Application August 30, 1950, Serial No. 182,191

2 Claims. (Cl. 29—283)

This invention relates to a protective device and more particularly to an automobile brake shoe lining protector.

It is a matter of common knowledge in the automobile industry that during the removal or the installation of a brake shoe return spring from its normal location on a brake shoe web, it is usually the practice to use a pair of brake shoe return spring pliers of which the outward end portions of one of the jaws of said pliers end in a pointed form. One outer end of jaw of said pliers normally uses the hole portion of the convex surface of the riveted brake shoe lining as a point of anchorage to assist in detaching or attaching brake shoe return springs to their normal place of attachment on the brake shoe web.

It is also a matter of common knowledge in the automobile industry that many brake shoes do not have counterbored riveted linings or having linings so bored and counterbored that it is difficult to bring into proper alignment, said brake shoe return spring to its place of attachment or during the removal of said brake shoe return spring from its place of attachment on an automobile brake shoe web.

The primary object of the invention is to provide a protector to prevent marring or damage to surfaces or portions of brake shoe lining, by the pointed ends of the pliers during diassembly or assembly of the brake shoe and lining unit from its normal position on an automobile brake shoe assembly.

Another object of the invention is to provide a protector of this character which may be readily adjusted to fit any size of brake shoe unit and can readily be installed or removed in a moment by a minimum of effort and loss of time by the operator.

The inventor further contemplates the provision in a protector of this kind, means permissible, by which the adjustment of the parts, when once set for a brake shoe unit of a certain size, will remain constant, despite repeated installation and removal of the device, but easily adjustable to fit varied sizes of brake shoes.

Another object of the invention is to provide a protector that is simple in construction and economical to manufacture.

A further object of the invention is to provide a protector to prevent the marring or damaging of said brake shoe lining by the digging into the convex surface of said brake shoe lining by the pointed ends of said brake shoe return spring pliers, which when damage occurs to said lining, usually means the discarding of said lining, causing economic loss in time and materials. Said protector is preferably made in two segments, an upper and a lower segment, and preferably of a construction permitting adjustment of said segments by the operator when desirable.

Still another object of the invention is to provide a protector whereby an operator may more easily disassemble or assemble an automobile brake shoe assembly with less danger to the operator when detaching or attaching said return spring by providing a device to prevent slippage of the pointed end of said brake shoe pliers when said pliers and device are used, thereby preventing the operator from sustaining personal injury to himself or damage to brake shoe lining fabric.

The above objects as well as the advantages inherent in the invention and not particularly pointed out above will be better apparent from a detailed description of the automobile brake shoe lining protector in connection with the accompanying specification, claim, and drawing.

Figure 2:
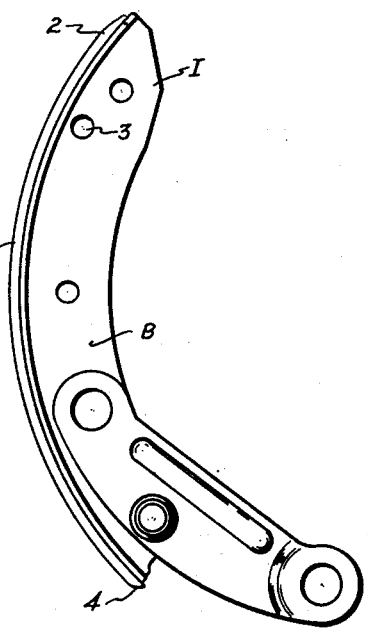
Figure 2 is a side view of the brake shoe and lining workpiece of a particular construction in position for attaching protector.

Referring to Figure 2, the brake shoe and lining workpiece as shown is provided with web B, flange A, brake shoe return spring anchor hole 3, brake shoe lining fabric 2, upper outer end 1, and lower outer end 4, of brake shoe flange A. A portion of the surface of the fabric or lining material 2 would be normally used as a place of anchorage for the pointed end of brake shoe pliers to attach end of the hook of a brake shoe return spring to perforated anchor hole 3 on the side of the brake shoe web B by an operator who has no other means available prior to the invention of my brake shoe lining protector.

Referring to the drawing of Figure 2 is a view in side elevation of an automobile brake shoe and lining unit of a particular construction having erected on the arcuate convex surface of the metallic brake shoe a fibre or plastic material fastened to the arcuate convex surface of a metallic brake shoe flange B.

Figure 1:
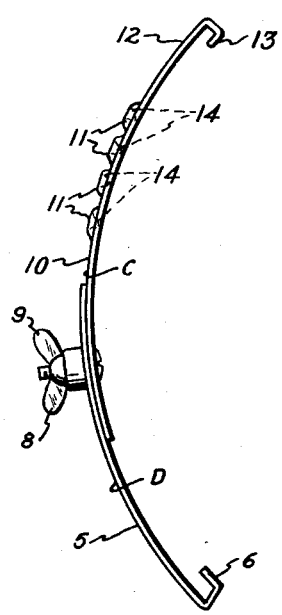
Figure 1 is a view in side elevation of the brake shoe lining protector.
Figure 3:
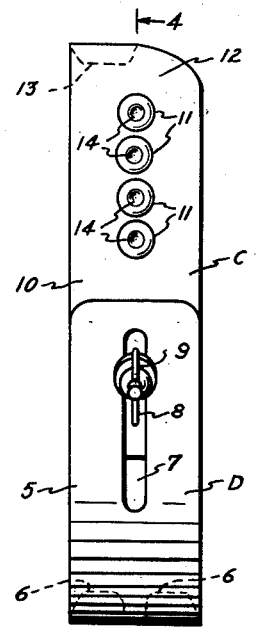
Figure 3 is a front view of the protector.
Figure 4:
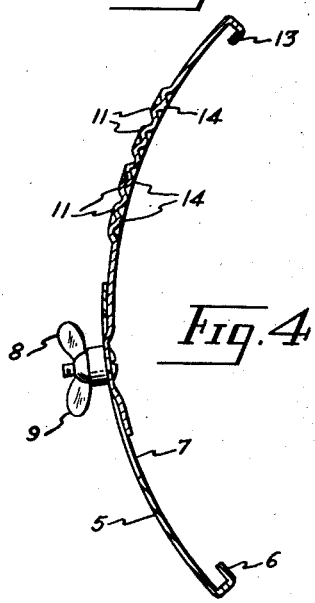
Figure 4 is a cross section of the protector taken through the line 4—4 of Figure 3.

Referring to Figure 1, D designates the lower segment of the protector of which a portion in proximity to the lower outer end 5 assumes a bifurcated hook-like form 6, bent inwardly from the convex surface of the metal protector and partially bent back upon itself to interlock with the lower end 4 of a brake shoe flange which is usually T-shaped in cross section. In proximity to the inner end of segment D on line 4—4 of Figure 3, a through perforated longitudinal slot 7 is erected, permitting, in combination with a threaded bolt and nut 8—9, projecting through a perforation of companion segment C, as means of shortening or lengthening the brake lining protector to accommodate brake shoes of various lengths.

On segment C of the brake lining protector, at its upper outer end 12 is formed in a similar form as 6 except, as will be seen from the drawings, a portion of the hook 13 in cross section is eliminated to permit a sidewise movement of the protector during removal or installation of the protector on the brake shoe workpiece. On the convex surface of the segment C in proximity to the end 12, the protector assumes a form of a plurality of embossed portions 11 of the metal, assuming preferably an oval shape, said embossed portions of the metal are preferably debossed inwardly from the convex surface to assume a concave recessed form 14 to accommodate the pointed outer end of the pliers and to provide a place of anchorage for said end of brake shoe return spring pliers during a service operation on an automobile brake shoe.

In applying the brake lining protector to a brake shoe and lining unit (Figure 2) the bifurcated hook 6 is applied over the lower end 4 of the flange A of the brake shoe, and then, while wrapping the protector over the curved surface of the brake lining 2, pressure is exerted on the side 10 of the free end 12 of the protector until the hook 13 interlocks with the upper end 1 of brake shoe flange A under tension, assuring non-slippage of the protector in endwise movement, but permitting sidewise movement of the end 12 when desirable.

I have found that the above described construction provides a brake lining protector which can readily be applied and removed and yet by reason of the tension of the hook-like form 6—13, the device is held securely to the shoe under a tension which successfully resists endwise movement of the brake lining protector during a brake service operation. It will be appreciated that to remove the protective device the operator merely pulls the end 12 in a sidewise movement to release hook-like form 13 from the upper outer end 1 of a brake shoe flange A accompanied by detaching the hook-like form 6 from the brake shoe workpiece.

Having illustrated and described the preferred embodiment of my invention, it should be apparent to those skilled in the art that the same permits various modifications in arrangement and detail. All such modifications as come within the scope of the following claims are to be considered a part of my invention.

I claim:

1. In a structure or device, a protector for protecting automobile brake shoe lining from damage by the pointed ends of the jaws of brake spring pliers during the removal or installation of an automobile brake shoe return spring from its normal place of attachment on an automobile brake shoe web, for providing a point of anchorage for the end of the jaws of a pair of brake shoe return spring pliers, during the removal or installation of said brake shoe return spring, said structure or device is comprised of a material, preferably of metal, of sufficient thickness to prevent penetration by the pointed ends of jaws of said pliers, to prevent damage to the said brake shoe lining during the operation of removing or installing of said brake shoe return spring from its normal place of attachment on an automobile brake shoe web, said structure or device is of sufficient width in cross section to prevent slippage from the workpiece during a service operation and is formed preferably in two segments, both segments having preferably an arcuate shape to conform to the curvature of the brake shoe workpiece, said segments are preferably connected by means of a longitudinally extending slot on the one segment and on the other segment by a through perforation in proximity to the inner end of companion segment, said segments are preferably connected at the inner end by a bolt extending through said longitudinally extending slot and through said perforation, said bolt in combination with a cup washer and nut, exerts a means of restriction of endwise movements of said segments, said lower segment at its lower outer end assumes a bifurcated hook-like portion, formed inwardly from the convex surface to accommodate the lower end of a brake shoe flange, said form prevents the upward and sidewise movement of lower outer end of said device during a service operation, said outer end of upper segment assumes a hook-like shape, formed inwardly from the convex surface of said protector, a portion of said hook-like shape is preferably eliminated in its cross-section to permit a means of attaining a sidewise movement of upper end of the device during installation or removal of said protector from an automobile brake shoe workpiece.

2. In a structure or device of the class described comprising: a pair of flexible metallic bands adapted to overlie a lining disposed on the outer surface of an automobile brake shoe; a plurality of embossed raised portions on the outer surface of one member of said metallic bands, said raised portions debossed inwardly from the surface of said embossed raised portions, providing a place of anchorage for a pointed end of a brake shoe return spring plier; engaging hook-like members on the outer ends of said metallic bands to overlie the ends of the brake shoe and clamping against the inner surface thereof for retaining the metallic bands in a close contact with the outer surface of the brake shoe; one of said metallic bands at its inner end having a longitudinal slot therein registering with a headed bolt passing through a perforated hole adjacent to the inner end of companion band; said bolt being threaded and provided with a threaded nut, permitting the inner ends of said metallic bands to be frictionally connected together; adjustment of said bolt and nut permitting the elongation or the retraction of said metallic bands, thereby accommodating various sizes of automobile brake shoes.

JAMES M. WAGNER.

References Cited in the file of this patent

UNITED STATES PATENTS

| Number | Name | Date |
|---|---|---|
| 1,384,472 | Leahy | July 12, 1921 |
| 1,600,672 | Janowski | Sept. 21, 1926 |
| 1,903,058 | McNaught et al. | Mar. 28, 1933 |
| 2,433,760 | Janes | Dec. 30, 1947 |